United States Patent
De Vera (10) Patent No.: US 9,593,257 B2
(45) Date of Patent: Mar. 14, 2017

(54) FUNCTIONALIZED METAL-CONTAINING PARTICLES AND METHODS OF MAKING THE SAME

(71) Applicant: Antonio De Vera, Avon Lake, OH (US)

(72) Inventor: Antonio De Vera, Avon Lake, OH (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 14/360,459

(22) PCT Filed: Nov. 23, 2012

(86) PCT No.: PCT/US2012/066446
§ 371 (c)(1),
(2) Date: May 23, 2014

(87) PCT Pub. No.: WO2013/078448
PCT Pub. Date: May 30, 2013

(65) Prior Publication Data
US 2014/0315025 A1 Oct. 23, 2014

Related U.S. Application Data

(60) Provisional application No. 61/563,242, filed on Nov. 23, 2011.

(51) Int. Cl.
  C09D 171/02 (2006.01)
  C01B 33/146 (2006.01)
  C01B 33/18 (2006.01)

(52) U.S. Cl.
  CPC .......... C09D 171/02 (2013.01); C01B 33/146 (2013.01); C01B 33/18 (2013.01); *Y10T 428/2982* (2015.01)

(58) Field of Classification Search
  None
  See application file for complete search history.

(56) References Cited

U.S. PATENT DOCUMENTS

| 4,597,800 A | 7/1986 | Turner |
| 7,232,556 B2 | 6/2007 | Yadav |

(Continued)

FOREIGN PATENT DOCUMENTS

| CN | 1487944 | 4/2004 |
| EP | 1 880 978 | 1/2008 |

(Continued)

OTHER PUBLICATIONS

International Search Report and Written Opinion of the International Searching Authority, PCT/US2012/066446, Feb. 8, 2013.

(Continued)

*Primary Examiner* — Erma Cameron
(74) *Attorney, Agent, or Firm* — Joseph E. Waters; McDonald Hopkins LLC (57) ABSTRACT

Processes for forming functionalized metal-containing particles. The processes employ a reactive precursor material comprising a metal atom, a leaving group attached to the metal atom, and a functional moiety attached to the metal atom. In one embodiment, functionalized metal-containing particles can be formed by grafting reactive precursors with functional groups to particles containing controlled surface hydroxyl concentrations; with the particles produced by a prescribed method. In another embodiment, a process for forming functionalized metal-containing particles comprises (a) providing a first solution comprising water, a surfactant, and a non-polar dispersant; (b) adding a reactive precursor to the first part to form a mixture, the reactive precursor comprising a metal atom comprising a leaving group attached to the metal atom, and an organic functional moiety attached to the metal atom; and (c) adding a catalyst to the (Continued)

mixture of (b) and reacting with heating under reflux to form functionalized metal-containing particles.

35 Claims, 6 Drawing Sheets

(56) References Cited

U.S. PATENT DOCUMENTS

| | | |
|---|---|---|
| 2004/0253170 A1 | 12/2004 | Zhou et al. |
| 2009/0274842 A1 | 11/2009 | Sawada et al. |
| 2010/0016488 A1 | 1/2010 | Karkkainen |
| 2010/0145001 A1 | 6/2010 | Findlay et al. |
| 2010/0221542 A1* | 9/2010 | Auger .................. C01B 33/126 428/402 |
| 2011/0004010 A1 | 1/2011 | Onozawa et al. |
| 2011/0065948 A1 | 3/2011 | Cromer et al. |
| 2011/0178240 A1 | 7/2011 | Acevedo et al. |
| 2011/0195011 A1* | 8/2011 | Devera .................. C01B 13/363 423/335 |
| 2012/0288714 A1 | 11/2012 | Devera et al. |

FOREIGN PATENT DOCUMENTS

| | | |
|---|---|---|
| JP | S61-34861 | 2/1986 |
| JP | H10-195081 | 7/1998 |
| WO | 2010090596 | 8/2010 |
| WO | 2011097444 A1 | 8/2011 |

OTHER PUBLICATIONS

International Search Report and Written Opinion of the International Searching Authority, PCT/US2012/066448, Feb. 5, 2013.

Oh, Chul, et al.; Facile synthesis of PEG-silica hybrid particles using one-step sol-gel reaction in aqueous solution; Colloids and Surfaces A: Physiochem. Eng. Aspects; Aug. 2009; pp. 145-150; 349; Elsevier B.V.; Amsterdam, NL.

Oh, Chul, et al.; Preparation of PEG-grafted silica particles using emulsion method; Materials Letters; Apr. 2005; pp. 929-933; 59; Elsevier; Amsterdam, NL.

* cited by examiner

FUNCTIONALIZED METAL-CONTAINING PARTICLES AND METHODS OF MAKING THE SAME

CROSS REFERENCE TO RELATED APPLICATIONS

This application is a 35 U.S.C. 371 application of PCT/US12/66446 entitled "Functionalized Silica Particles and Methods of Making the Same" filed on Nov. 23, 2012, which claims the benefit of U.S. Provisional Patent Application No. 61/563,242 entitled "Functionalized Silica Particles and Methods of Making the Same" filed on Nov. 23, 2011, each of which is hereby incorporated in its entirety by reference.

FIELD OF THE INVENTION

The present invention relates to functionalized metal-containing particles, such as functionalized silica particles, and methods of making such particles.

BACKGROUND

Functionalized materials, such as functionalized hydrogel polymers or particles, may be employed in a variety of applications to modify the properties of a surface or substrate of interest. For example, a surface may be modified to prevent a particular material from binding or adhering to a surface, or can be modified to a change in response to external stimuli.

Silica hydrogel particles functionalized with polyethylene glycol have been provided as materials to modify surfaces or substrates. Hydrogel silica is currently prepared by: (1) silanation reactions, e.g., isocyanate or ether reactions of alkoyxilanes to PEG urethanes; and (2) grafting to silica PEG moieties prepared by an amino coating (e.g., bis-trimethoxysilylpropylamine) followed by amide formation using N-succimidyl ester of methoxy PEG carboxylic acid. Functionalized silica formed by previous methods, however, do not exhibit good stability in either aqueous or organic media, including in the presence of salts such as 5% sodium chloride in ortho-chlorophenol. Additionally, the efficiency of these processes is low, particles tend to aggregate, or the particles are sticky in a dry state or agglomerate in slurry formulations.

SUMMARY

The present invention provides methods for forming functionalized metal-containing particles. The particles can be functionalized with various chemistries that can be employed in various applications, such as, for example, those that facilitate the prevention of protein attachment of certain proteins and organisms. The present methods provide avenues for forming functionalized metalloxane particles, such as, silica, that is stable. The methods may allow for providing functionalized silica of a controlled, desired particle size distribution. The methods also allow for particles having a relatively narrow particle size distribution.

In one aspect, the present invention provides a reactive precursor material bearing a desired moiety, which precursor can be used to provide functionalized metal-containing particles bearing a desired moiety attached to the surface of the particles. The precursor can comprise (a) a metal component comprising a leaving group attached to the metal, and (b) an organic functional moiety attached to the metal atom. In one embodiment, the precursor is a urethane or a urea material having a desired moiety bonded to an isocyanated alkoxy silane. In one embodiment, the precursor material is a urethane or urea material bearing a polyethylene glycol moiety.

In another aspect, the present invention provides a method of forming functionalized metal-containing particles. In one embodiment, the invention provides a method for forming silica comprising providing a precursor material derived from an isocyanated alkoxy silane and a hydroxyl-terminated or amine-terminated moiety, and reacting the precursor material with silica particles having a plurality of surface silanols to provide functionalized silica particles.

In another aspect, the present invention provides a method of forming functionalized silica comprising a precursor material derived from an isocyanated alkoxy-silane and a desired hydroxyl-terminated or amine-terminated moiety, and reacting the precursor material in a water solution to form silica particles having the desired moiety at or near the surface of the silica particles.

In one aspect, the present invention provides a process for producing a metal-containing particle having an organo-functional grafted thereto, the method comprising forming a metal containing particle by (a) forming a first phase comprising a mixture of water, a metal source, a first catalyst, a first surfactant, and a first alcohol; (b) adding the first phase to a second phase comprising water, a second alcohol, and a second surfactant to form a blend; (c) treating the blend with a phase enhancer; and (d) treating the blend from (c) with a second catalyst to form metal-containing particles comprising one or more surface hydroxyl groups; and grafting a reactive precursor to the particles.

In one embodiment, step (d) of forming the metal containing particles further comprises drying the particles, calcining the particles, or both drying and calcining the particles to reduce the concentration of surface hydroxyls on the particles. In one embodiment, the particles have a residual water content of between 0.1% to 15 wt %.

In one embodiment, grafting the reactive precursor to the particles comprises (e) adding the reactive precursor material to a system comprising the particles, a water free aprotic solvent, and a non-ionic surfactant; and (f) adding a base catalyst to the resulting solution of (e).

In one embodiment, the water free aprotic solvent is chosen an alkane having 5-20 carbon atoms; an alkene having 5-20 carbon atoms; an aromatic compound; tetrahydrofuran; pyrrolidone; a substituted pyrrolidone; diethyl ether; chloroform; carbon tetrachloride; acetone; acetonitrile; dimethyl sulfoxide; furfural; or a combination of two or more thereof.

In one embodiment, the non-ionic surfactant of the system in step (e) comprises polyethylene glycol, polypropylene glycol, block copolymers of ethylene oxide and propylene oxide, cyclic, phenolic, substituted aromatics and substituted phenolics in a polyethylenepolypropylene glycol, alkyl polyethers, polyols, and combinations of two or more thereof.

In one embodiment, the base catalyst of (f) is chosen from ammonium hydroxide, quaternary ammonium hydroxides, hydroxylamines, tetramethylammonium hydroxide, derivatives of hydroxylamines, amino pyridines, or combinations of two or more thereof.

In one embodiment, the resulting mixture of (e) and (f) is reacted with stirring at a rate of from about 30 RPM to about 400 RPM.

In one embodiment, the functional particles have a mean particle size of from about 0.5 micron to about 300 microns.

In one embodiment, the functional particles have a surface area of from about 20 m²/gram to about 1200 m²/gram.

In another aspect, the present invention provides a process for forming a functionalized metal-containing particle comprising (a) providing a first solution comprising water, a surfactant, and a non-polar dispersant; (b) adding a reactive precursor to the first part to form a mixture, the reactive precursor comprising a metal atom comprising a leaving group attached to the metal atom, and an organic functional moiety attached to the metal atom; and (c) adding a catalyst to the mixture of (b) and reacting with heating under reflux to form functionalized metal-containing particles.

In one embodiment, the non-ionic surfactant polyethylene glycol, polypropylene glycol, block copolymers of ethylene oxide and propylene oxide, cyclic, phenolic, substituted aromatics and substituted phenolics in a polyethylenepolypropylene glycol, alkyl polyethers, polyols, and combinations of two or more thereof.

In one embodiment, the non-polar dispersant comprises a cycloaliphatic compound, an alkane comprising 5-20 carbon atoms, an alkene comprising 5-20 carbon atoms, an aromatic compound, a substituted aromatic compound, an alcohol comprising 8-12 carbon atoms, or a combination of two or more thereof.

In one embodiment, the catalyst is chosen from derivatives of hydroxylamines, tetramethylammonium hydroxide, amino pyridines, or combinations of two or more thereof.

In one embodiment, the temperature of the reaction is from about 30° C. to about 100° C.; even from about 50 to about 90° C.

In one embodiment, the reaction of (c) is conducted with stirring at a rate of from about 30 RPM to about 200 RPM.

In one embodiment the reactive precursor comprises a metal component comprising a metal atom comprising a leaving group attached to the metal, and an organic functional moiety attached to the metal atom. In one embodiment, the reactive precursor comprises a metal chosen from Si, Ti, Fe, Al, Zr, Nb, Y, B, Ce, V, Zn, Cu, Ni, Co, Ge, Mn, Mg, Cr, Fe, V, a rare earth metal, or a combination of two or more thereof. The leaving group can comprise an alkoxy group, a halogen, or a combination thereof.

In one embodiment, the organic functional moiety comprises a glycol, an alkylene glycol, an acrylic, an amide, a quaternary ammonium compound, a phosphate, a phosphonate, a sulfonate, or a combination of two or more thereof.

In one embodiment, the functional particles have a mean particle size of from about 0.5 micron to about 100 microns.

In one embodiment, the functional particles have a surface area of from about 20 m²/gram to about 500 m²/gram.

In one embodiment, the particles an average pore size of from about 10 angstroms to about 2000 angstroms.

In one embodiment, the particles comprise macropores of about 0.25 micron or greater.

DETAILED DESCRIPTION

The present invention provides methods for forming functionalized metal-containing particles from a reactive precursor material comprising a desired moiety. In one embodiment, the precursor material can be used to functionalize the surface of already formed silica particles. In another embodiment, the precursor material itself can be used to directly form functionalized silica particles.

Reactive Precursor

The reactive precursor material can comprise (a) a metal component comprising a leaving group attached to the metal, and (b) an organic functional moiety attached to the metal atom. The reactive precursor material can also be referred to herein as a functional organometal material. In one embodiment, the metal atom of the functional organometal material is chosen from Si, Ti, Fe, Al, Zr, Nb, Y, B, Ce, V, Zn, Cu, Ni, Co, Ge, Mn, Mg, Cr, Fe, V, a rare earth metal, or a combination of two or more thereof.

The leaving group can be any suitable labile leaving group. In one embodiment, the leaving group is chosen from an alkoxy group, a halogen, an anyloxy group, an acyloxy group, an alkoxy carbonyloxy group, an alkyl thio group, etc., or a combination of two or more thereof. In one embodiment, the leaving group is methoxy, chlorine, fluorine, or a combination of two or more thereof.

While the leaving group is described as being attached to the metal atom, it will be appreciated that the phrase "attached to the metal atom" can refer to the leaving group being directly attached to the metal atom or indirectly attached to the metal atom via a linking group that is directly attached to the metal atom. Examples of suitable linking groups include, but are not limited to, an alkyl or aryl group.

The organic functional moiety can be selected as desired for a particular purpose or intended application. In one embodiment, the organic functional moiety is chosen from a glycol, an alkylene glycol, an acrylic, an amide, a quaternary ammonium compound, a phosphate, a phosphonate, a sulfonate, an amino, a mercapto, an alkyl, an alkyne, an alkene, an azo, a conjugated alkene, a cyclic compound, an alcohol, or a combination of two or more thereof. In one embodiment, the organic functional moiety of the precursor material comprises a polyalkylene glycol moiety, and is derived from a polyalkylene glycol alkyl ether or an amine-terminated polyalkylene glycol alkyl ether. The polyalkylene glycol alkyl ether may be of the Formula (1):

$$R^6-O-(R^4-O)_x-(R^5-O)_y-R-OH \qquad (1)$$

and the amine terminated polyakylene glycol alkyl ether may be of the Formula (2):

$$R^6-O-(R^4-O)_x-(R^5-O)_y-R-NH_2 \qquad (2)$$

where $R^4$ and $R^5$ are each individually an alkyl of 2 to 10 carbon atoms, linear or branched (as in isopropyl), $R^6$ is an alkyl of 1 to 10 carbon atoms, R is one of $R^4$ or $R^5$, and x and y are such that the molecular weight of polyalkylene glycol or amine-terminated polyalkylene glycol is at least from 100 to 7000 Da. In one embodiment, the polyalkylene glycol alkyl ether or amine-terminated polyalkylene glycol alkyl ether has a molecular weight of about 350 to about 3,000 Da.

Non-limiting examples of suitable polyalkylene glycol alkyl ethers that may be used to form the precursor include, polyethylene glycol monomethyl ether, polyethylene glycol monoethyl ether, polyethylene glycol monoisopropyl ether, polyethylene glycol monobuthyl ether, polyethylene glycol monooctyl ether, polyethylene glycol monodecyl ether, polyethylene glycol monohexadecyl ether, polyethylene glycol monooctadecyl ether, polypropylene glycol monomethyl ether, polypropylene glycol monoethyl ether, polypropylene glycol monoisopropyl ether, polypropylene glycol monobuthyl ether, polypropylene glycol monooctyl ether, polypropylene glycol monodecyl ether, polypropylene glycol monohexadecyl ether, polypropylene glycol monooctadecyl ether, etc.

Other suitable functional moieties for forming the functional organometal material include, but are not limited to, amides, quaternary ammonium compounds, etc. In one embodiment, the functional moiety comprises an alkyl acrylamide, an alkyl methacrylamide, or a combination of two or more thereof. The alkyl(meth)acrylamide material may include alkyl and carbonyl alkyl(meth)acrylamides having from 2 to 15 carbon atoms in the alkyl moiety, and preferably from 4-12, or 6-10 carbon atoms in the alkyl moiety. Exemplary monomers include those such as tertiary butyl acrylamide, N-tertiary octyl acrylamide, isopropyl acrylamide, N-(1,1,-dimethyl-3-oxobutyl)acrylamide, etc.

In another embodiment, the functional moiety is chosen from a quaternary ammonium compound. Non-limiting examples of suitable quaternary ammonium compounds and phenolic antimicrobial agents include benzalkonium chlorides and/or substituted benzalkonium chlorides, di(C6-C14)alkyl di short chain (C1-4 alkyl and/or hydroxyalkyl) quaternaryammonium salts, N-(3-chloroallyl) hexaminium chlorides, benzethonium chloride, methylbenzethonium chloride, and cetylpyridinium chloride. Other suitable quaternary compounds include alkyl dimethylbenzylammonium chlorides, dialkylmethylbenzylammonium chlorides, and mixtures of two or more thereof. An example of a suitable quaternary amine containing silane is octadecyldimethyl(3-trimethoxysilyl propyl) ammonium chloride from Gelest, Inc.

In one embodiment, the reactive precursor material comprises a urethane or urea derived from (a) an isocyanated alkoxysilane and (b) a material of a desired moiety that has a terminal or reactive hydroxyl or amine group for reacting with the isocyanate group of the isocyanated alkoxysilane. In one embodiment, the precursor material is a material containing a urethane or urea linkage derived from (a) an isocyanated alkoxysilane, and (b) a hydroxyl-terminated or amine-terminated ether. In one embodiment, the hydroxyl-terminated or amine-terminated ether is a polyalkylene glycol alkyl ether or an amine-terminated polyakylene glycol alkyl ether for providing silica particles functionalized with a polyalkylene glycol moiety.

The precursor material can be derived from an isocyanated alkoxysilane of the Formula (3):

where $R^1$, $R^2$, and $R^3$ are alkoxyl groups of 1 to 10 carbon atoms, and A is a divalent radical selected from straight or branched alkylene of from 1 to 12 carbon atoms, phenylene or phenylene substituted with halogen, or alkyl or alkoxyl of from one to four carbon atoms. $R^1$, $R^2$, and $R^3$ may be the same or different from each other. In one embodiment, $R^1$-$R^3$ are each ethoxy groups, and A is propyl such that the isocyanated alkoxysilane is 3-(triethoxysilane) propyl isocyanate.

In one embodiment, the precursor can be formed by reacting an isocyanated alkoxysilane with a polyalkylene glycol alkyl ether or an amine-terminated polyakylene glycol alkyl ether. The reaction can be carried out in the presence of a metal catalyst and an appropriate solvent. In one embodiment, the precursor is formed by reacting an isocyanated alkoxysilane and a polyalkylene glycol alkyl ether or an amine-terminated polyakylene glycol alkyl ether in the presence of a dibutyl tin catalyst and tetrahydrofuran under reflux for two days. After completion of the reaction, the precursor product is stripped of the solvent (e.g., tetrahydrofuran).

Without being bound to any particular theory, the precursor material may have the Formula (4) and/or (5):

or:

depending on whether the precursor is derived from a hydroxyl or amine terminated material, where $R^1$-$R^6$, R, x, and y may be any component or value as described above.

While the functional organometal materials of Formulas (3)-(5) are described in terms of a precursor containing Si as the metal atom, it will be appreciated that the materials are not so limited and the Si atom can be replaced by any other suitable metal atom.

The precursor material can be used to provide a functionalized metal-containing (including, but not limited to, silica) such as, for example, a PEGylated silica having PEG moieties at the surface of the silica. A functionalized metal-containing particle can be formed by: (1) reacting the precursor material with metal-containing particles, or (2) direct formation of metal-containing particles from the reactive precursor material.

Grafting of Precursor to Metal-Containing Particles

In one embodiment, functionalized metal-containing particles are provided by reacting the precursor material with metal-containing particles to provide metal-containing particles having a desired moiety, e.g., PEG moieties, attached to or disposed on the surface of the particles. The grafting reaction can be conducted in a substantially non-aqueous solution in a presence of either an acid or base.

The metal-containing particles can be provided such that they have a sufficiently large concentration of surface hydroxyl groups to react with the precursor material and provide metal-containing particles having a desired degree of functionalization. For example, silica particles having a plurality of surface silanols can be employed.

Grafting the reactive precursor to the metal-containing particles can comprise (a) adding the the reactive precursor material to a system comprising the metal containing particles, a water free aprotic solvent, and a non-ionic surfactant, and (b) adding a base catalyst to the reaction mixture of (a).

The aprotic solvent can be chosen an alkane having 5-20 carbon atoms; an alkene having 5-20 carbon atoms; an aromatic compound; tetrahydrofuran; pyrrolidone; a substituted pyrrolidone; diethyl ether; chloroform; carbon tetrachloride; acetone; acetonitrile; dimethyl sulfoxide; furfural; or a combination of two or more thereof.

The non-ionic surfactant can be chosen from polyethylene glycol, polypropylene glycol, block copolymers of ethylene oxide and propylene oxide, cyclic, phenolic, substituted aromatics and substituted phenolics in a polyethylenepolypropylene glycol, alkyl polyethers, polyols, and combinations of two or more thereof.

The base catalyst for the grafting reactive can be chosen from ammonium hydroxide, quaternary ammonium hydroxides, hydroxylamines, tetramethylammonium hydroxide, derivatives of hydroxylamines, amino pyridines, or combinations of two or more thereof.

The grafting process can be carried out at a temperature of from about 0° C. to about 100° C.; from about 30° C. to about 90° C.; even from about 60° C. to about 85° C. In one embodiment, the grafting process is conducted at a temperature of about 80° C. The grafting process can also be conducted with stirring at a rate of from about 30 RPM to about 200 RPM.

Metal-containing particles having a sufficiently large concentration of surface hydroxyl groups can be formed using a synthesis route such as that described in U.S. patent application Ser. No. 12/701,862 filed Feb. 2, 2010 and 61/513,278 filed Jul. 29, 2011, each of which is incorporated by reference in its entirety and which process can be referred to herein as a "biphasic synthesis" or "biphasic process."

In one embodiment, the metal-containing particles can be formed by (a) forming a first phase comprising a mixture of water, a metal source, a first catalyst, a first surfactant, and a first alcohol; (b) adding the first phase to a second phase comprising water, a second alcohol, and a second surfactant to form a blend; (c) treating the blend with a phase enhancer; and (d) treating the blend from (c) with a second catalyst to form metal-containing particles comprising one or more surface hydroxyl groups; and grafting a reactive precursor to the particles.

The particles can be formed in a two step process comprising forming a metaloxo oligomer precursor in a first phase and forming metal oxide particles via a second phase. Forming the metaloxo oligomer comprises adding a metal source to a solution comprising water, a first alcohol, and a first catalyst. The reaction is conducted under adiabatic conditions and allowed to reach a maximum exothermicity. The metal source is added at a controlled rate, and the reaction is allowed to equilibrate to 30° C. after the metal source addition is complete. A first surfactant is added to this solution and allowed to equilibrate. In one embodiment, the first surfactant may be a co-surfactant system. Upon equilibration of the system, this first phase comprises a metaloxo oligomer.

The first phase may be formed, in one embodiment, by first charging water, the first surfactant, the first catalyst, and the first alcohol to a hydrolysate reactor. The metal source can be added in a controlled or measured manner to the hydrolysate reactor. The metal source reacts in the hydrolysate reactor to form a metal oxide oligomer. The metal source may be added to the hydrolysate reactor to control the temperature rise of the system. For example, in one embodiment, a silica source is added to the hydrolysate reactor at a rate so that the adiabatic temperature rise is at a temperature range from about 10° C. to about 100° C., and preferably the temperature rise is to about 72° C. The silica source can react in the hydrolysate reactor to form oligomers of methoxysiloxanes when a methoxy silane is employed. In one embodiment, the rate of adding a silica source can be about 5-15 gm/min for a 2300 gm batch size. In one embodiment, the metal source may be added to the first phase over a period of from about 20 to about 120 minutes. In one embodiment, the metal source comprises a metal alkoxide, and the molar ratio of water to metal alkoxide source in the first phase is from about 0.5 to about 4.0.

It will be appreciated that the first surfactant can be added to the hydrolysate reactor after the addition of the metal source. The first surfactant such as, for example, a co-surfactant can be added in a measured or controlled manner or added after the all the metal source is added to the hydrolysate reactor. As with the surfactant in the particle reactor, the co-surfactant facilitates forming the metal oxide polymers within a micellar structure as dictated by phase equilibrium.

The first phase comprising the metaloxo oligomer is then added to a reactor comprising water, a second surfactant, and a second alcohol. A phase enhancer may then be added to the system. In one embodiment, the phase enhancer is added to the system after the first phase by adding the contents of the hydrolysate reactor to the particle reactor, and then adding the phase enhancer to the particle reactor and allowing the contents to equilibrate. In one embodiment, the phase enhancer is added immediately after all the material from the hydrolysate is fed to the particle reactor and allowed to equilibrate within the micelles. Adding the phase enhancer prior to adding the catalyst to the particle reactor enhances the stability of large particle formation, allows for the generation of consistent particle growth and prevents the gelling of the suspension.

Mixing influences the size of the initial micellar diameter as well as particle growth and final particle size. Turbulent mixing tends to generate smaller particles and nearly uniform particle size distribution. Slower mixing with less turbulence tends to: (1) generate a wide particle size distribution; and (2) cause metal oxide particles to settle prematurely at the bottom of the particle reactor before attaining further particle growth to form unwanted packed solid particles. Therefore, a suitable mixing regime is desirable to effectively suspend large particles as the clusters grow from micelles to a final stable particle size and distribution. This suitable mixing regime further may be dictated by the type of agitator and the tip speed impeller velocity. The tip speed impeller velocity may be about 0.2 to 0.8 feet per second. In one embodiment, the first phase may be added to the second phase over a period of about 30 minutes to about 150 minutes.

After addition of the first phase to the second phase, a biphasic system forms as shown by the presence of a suspension or emulsion. The second surfactant aids in forming micelles to a size dictated by phase equilibrium. The particle reactor contains a biphasic system that allows particle growth from micelles. The temperature of the first phase may be from about 30° C. to about 80° C., and the temperature of the second phase may be from about 30° to about 100° C. The temperature of the initial emulsion can be about 30-80° C. to further enhance the biphasic system formed in the particle reactor. In one embodiment, the temperature is about 50-60° C., which is the cloud point for the nonionic surfactant PEG.

As described above, the phase enhancer may be added to the system after the first phase (from the hydrolysate reactor) is added to the particle reactor. After addition of the phase enhancer, the method includes a measured or programmed addition of a second catalyst to the particle reactor. The second catalyst is added in a measured or programmed manner to the particle reactor so that the metal oxide oligomer within the mixture forms the desired metal oxide particle as opposed to forming an undesirable gellified suspension or particle to particle adhesion by hydrogen bonding. Thus, a measured addition of the second catalyst aids in partially opening up the layer of a nonionic surfactant to allow the particles to interact and form metal oxide bonds with other particles as a mode of particle growth.

The base catalyst is added to the mixture until a desired mean silica particle size is obtained. Generally, the silica particle size increases with the amount of catalyst added to the particle reactor up to a critical pH. The silica particle size is measured as the particle diameter using a measuring system such as, for example, a Horiba LA950 system. During the initial addition of the catalyst, the pH of the suspension may be about 1.3. Depending on the amount of base catalyst added, the pH of the mixture may increase to a pH of about 5, depending upon the level of alkoxysilane and acid catalyst used in the hydrolysate. Desirably, the pH of the mixture is no greater than about 3.5 prior to treating with the second catalyst, and no greater than about 6 during the treatment step with the second catalyst. Once the silica particles grow to the desired size, the catalyst is no longer added and the silica particles are allowed to age at the temperature of the particle reactor.

The metal source may include, for example, a metal alkoxide, a hydrolysable organometallic compound, oxo metal oligomers, or mixtures of two or more thereof. Of course, the metal oxide desired as a final product will determine the identity of the metal source. In one embodiment, the metal source comprises a metal chosen from Si, Ti, Fe, Al, Zr, Nb, Y, B, Ce, V, Zn, Cu, Ni, Co, Ge, Mn, Mg, Cr, Fe, V, a rare earth metal, or a combination of two or more thereof. In one embodiment where synthetic silica is the desired product, the metal source is a silicon alkoxide or mixture of alkoxides where at least one of the alkoxides contains 2 hydrolyzable groups. Examples of silica sources include, but are not limited to, tetramethylorthosilicate (TMOS), tetraethylorthosilicate (TEOS), tetrapropylorthosilicate (TPOS), tetramethoxy silane, tetrabutoxy silane, methyl trimethoxy silane (MTMS), methyl triethoxy silane (MTES), phenyl trimethoxy silane, isobutyl trimethoxy silane, and higher tetraalkoxysilanes, siloxane oligomers derived from alkoxysilanes, and pre-polymerized alkoxysilanes such as polymethoxysiloxane so long as it is amenable to micelle formation, including a tetramer of polymethoxysiloxane such as methylsilicate. In one embodiment, the first phase has a selected molar ratio of water to siloxane oligomer derived from alkoxysilane to provide at least a siloxane heptamer, a cyclic siloxane, or mixtures thereof. A high purity silica source, such as alkoxysilane, can be obtained from a crude source such as those formed from the reaction of silicon metal with methanol in the presence of a metal catalyst such as copper and those exemplified in E. G. Rochow, "Methyl Silicate from Silicon and Methanol," Jl. Amer. Chem. Soc. 70, 2170-2171 (1948), U.S. Pat. Nos. 4,727,173, 4,999,446, and 5,084,590, which are incorporated by reference. Purification of alkoxysilane can be accomplished by distillation as provided in U.S. Pat. No. 5,902,893 which is incorporated by reference.

Examples of other metal sources for the production of other metal oxide particles include metal compounds such as isopropoxides, acetates, acetylacetonate, oxylates, butoxides, methoxides, ethoxides, chloromethoxy, chloroethoxy, methyls, ethyls, and the like.

The first catalyst can comprise an acid catalyst or a base catalyst. In one embodiment, the first catalyst is an acid type catalyst. Examples of suitable acid catalysts include, but are not limited to, hydrochloric acid, nitric acid, sulfuric acid, phosphoric acid, fluoric acid, formic acid, acetic acid, propionic acid, butanoic acid, pentanoic acid, hexanoic acid, monochloroacetic acid, dichloroacetic acid, trichloroacetic acid, trifluoroacetic acid, oxalic acid, malonic acid, sulfonic acid, phthalic acid, fumaric acid, citric acid, maleic acid, methylmalonic acid, adipic acid, p-toluenesulfonic acid, or combinations of two or more thereof. In one embodiment, the first catalyst comprises a base catalyst chosen from ammonium hydroxide, quaternary ammonium hydroxides, hydroxylamines, derivatives of hydroxylamines, amino pyridines, or combinations of two or more thereof. In one embodiment, the base catalyst has a concentration of about 0.01% to about 10% by weight.

The first alcohol can be chosen from a primary alcohol, a secondary alcohol, or a combination of two or more thereof. In one embodiment, the primary alcohol is an alcohol having one to ten carbons. Suitable alcohols include, but are not limited to, methanol, ethanol, propanol, butanol, pentanol, hexanol, heptanol, octanol, nonanol, decanol, or combinations of two or more thereof.

In one embodiment, the first surfactant can be a co-surfactant system. The co-surfactant can aid in transporting solution to the micelle containing metal oxide oligomers such as, for example, low molecular weight polymethoxysiloxanes. In one embodiment, the co-surfactant system includes a mixture of a non-polar compound and a slightly polar compound. The nonpolar compound can be a hydrocarbon such as cyclic hydrocarbons including cyclopentane, cyclohexane, cyclooctane, and even derivatives thereof such as methyl cyclohexane, p-alkyl cyclohexane, and the like, and linear or branched aliphatic hydrocarbon having carbon numbers from 5 to 12 and alkyl derivatives thereof such as isopentane, isohexane, isooctane, and the like, or a combination of two or more non-polar compounds. The slightly polar compound of the co-surfactant system can be a slightly polar alcohol. Particularly suitable slightly polar alcohols can be chosen, for example, from tertiary alcohols, cyclic alcohols, or combinations of two or more thereof. Suitable tertiary alcohols include, for example, tertiary butyl alcohol, 2-methyl 2-butanol or tertiary amyl alcohol, or derivatives thereof such as 2-methyl 2-pentanol, 2-methyl 2-hexanol, and the like. Non-limiting examples of suitable cyclic alcohols include cyclopentanol, cyclohexanol, cyclooctanol and alkyl derivatives thereof such as 4-methylcyclohexanol, and the like.

Additional examples of surfactants suitable for the co-surfactant include, for example, alcoholic solvents and ketonic solvents. Examples of suitable alcoholic solvents include, for example, tertiary amyl alcohols, methyl alcohol, ethyl alcohol, n-propanol, i-propanol, n-butanol, i-butanol, sec-butanol, t-butanol, 4-methyl 2-pentanol, cyclohexanol, methylcyclohexanol, and/or glycerol. Examples of suitable ketonic solvents include acetone, methyl ethyl ketone, methyl-n-propyl ketone, methyl-n-butyl ketone, methyl-i-butyl ketone, diethyl ketone, cyclohexanone, methylcyclohexanone or acetylacetone.

In one embodiment, the second surfactant is a nonionic surfactant. The molecular weight of the nonionic surfactant, including, but not limited to those based on ethoxylate, polyethoxylate, polypropoxylate, phenolate, or polyol and the like, may be from about 400 to about 100,000. Examples of suitable nonionic surfactants include, but are not limited to, polyethylene glycol, polypropylene glycol, phenolates, polyols, polyoxyethylene stearate, polyoxyethylene sorbitan monooleate, polyoxyethylene lauryl ether, nonylphenoxypoly(ethyleneoxy)ethanol, nonylphenyoxypoly(ethyleneoxy)ethanol, and combinations of two or more thereof.

The second alcohol can be chosen from a primary alcohol, a secondary alcohol, or a combination of two or more thereof. Suitable primary alcohols include, primary alcohols having from one to ten carbon atoms such as those previously described with respect to the first alcohol. The second alcohol can be the same or different than the first alcohol.

Applicants have found that suitable materials for the phase enhancer include those materials that are suitable for enhancing the stability of particle formation and preventing gelling of the suspension. Suitable materials for the phase enhancer include, for example, slightly polar alcohols. In one embodiment, slightly polar alcohols include alcohols that are less polar than alcohols with a C number greater than 3. Exemplary slightly polar alcohols for use as the second phase enhancer include low carbon alcohols. The phase enhancer can include, for example, primary alcohols of four to ten carbons such as butanol, pentanol, hexanol, and the like. The phase enhancer can also be chosen from alkyl derivatives of alcohols of four to ten carbon atoms including, but not limited to, isobutanol, isopentanol, and the like. Secondary alcohols may also be suitable for use as a phase enhancer.

The second catalyst can be chosen from an acid or base. In an exemplary embodiment, the second catalyst is a base. Suitable base catalyst materials include, for example, non-alkaline metal bases such, organic bases, non-metal bases that promote nucleophilic substitution or combinations of two or more thereof. Examples of suitable non-alkaline metal bases include ammonium hydroxide, as well as aqueous solution of ammonium carbonate or ammonium bicarbonate. Examples of suitable organic bases include quartenary alkyl ammonium hydroxides such as tetramethylammonium hydroxide. Examples of suitable non-metal bases that promote nucleophilic substitution include hydroxylamines and organic hydroxylamines such as N,N-dimethylhydroxylamine, N,N-diethylhydoxylamine, and 4-dimethylaminopyridine.

Following particle formation, the particles can be treated to remove the bulk of organic material from the system such as by high temperature evaporation past the highest boiling compound or by low temperature and negative pressure stripping. Further, the particles can then be treated to remove unwanted material including residual organics from the reactants and inorganic hydrocarbons. Without being bound to any particular theory, residual organics are believed to be those organics that are bound or trapped within the particle and can be up to about 5% carbon on a dry basis. Optionally, organic stripping may be performed by heating the metal oxide particles (e.g., silica) at about 30 to about 100° C. for a sufficient period of time to remove the organic material. Organic stripping may further comprise adding water to the system and continuing heating of the particles at about 30 to about 100° C. to remove the residual organics.

Additionally, the particles can be treated with an aprotic solvent to remove organics and to reduce the inorganic hydrocarbon content to almost negligible values. The silica particles are then treated with an aprotic solvent to assist in removal of residual organics and inorganic carbon. In one embodiment, treating with the aprotic solvent comprises washing the particles with the aprotic solvent. The aprotic solvent can be decanted, and the decanted solutions contain the aprotic solvent and organic material. The particles may be washed one, two, or more times until the desired organic level and inorganic hydrocarbon level is achieved.

In another embodiment, treating with the aprotic solvent comprises washing with the aprotic solvent such as described above, but further comprises washing the particles with water. These steps may be repeated as desired to effectively remove the residual organic carbon.

In still another embodiment, treating with the aprotic solvent comprises an aprotic solvent/water stripping step. An aprotic solvent/water stripping step can comprise adding the aprotic solvent and water to the suspension of metal oxide particles. The suspension is then heated to remove organic material along with the aprotic solvent and the water via vaporization. These steps can be repeated until a desired level of organic material and inorganic hydrocarbon is achieved. Heating may be conducted, for example, at a temperature of from about 75 to about 100° C. When multiple aprotic solvent/water stripping steps are employed, the temperature of the various steps may the same or different from one another. In one embodiment, the temperature of the heating step in the aprotic solvent/water stripping operation is increased with each successive treatment. In one embodiment, one or more hot water washes may also be employed after the aprotic solvent/water stripping treatments have been completed. The additional water washes may be useful to ensure complete elimination of organics from the system.

The particles formed by the above described biphasic process may be discrete spherical particles or agglomerated particles with controlled porosity and pore size distribution and can exhibit a significant concentration of surface silanols. In accordance with the present method, the particles formed by the biphasic process can be subjected to additional thermal treatment steps such as calcining or densifying, which can further affect the number of surface hydroxyl sites on the particles. This allows for a manner in which to control or adjust the concentration of surface hydroxyl groups and thereby control the number of grafting sites and the concentration of functional groups in the functionalized particles. The surface hydroxyl sites provide the metal-containing particles with reactive sites for grafting a functional group to the metal-containing particles such as by reacting the functionalized precursor material with the metal-containing particles in a method as described above.

Direct Formation of Functionalized Metal-Containing Particles

In another embodiment, the reactive precursor material can be used to directly form metal-containing particles having a surface with a desired functional group. For example, the precursor material may be reacted in a solution comprising an amphiphilic surfactant with heating under reflux to provide nearly spherical hydrogel particles with desired functional groups at the surface. In one embodiment, the process for forming functionalized metal particles comprises (a) providing a first solution comprising water, a surfactant, and a dispersant; (b) adding a reactive precursor to the first part to form a mixture, the reactive precursor comprising a metal atom, a leaving group attached to the metal atom, and an organic functional moiety attached to the metal atom; and (c) adding a catalyst to the mixture of (b) and reacting with heating under reflux to form functionalized metal-containing particles. The reaction may be carried out at a temperature of about 30 to about 100° C. from about 50° C. to about 90° C., even from about 60° C. to about 80° C. Heating can be conducted under reflux.

The surfactant can be an amphiphilic surfactant that contains both a hydrophobic and a hydrophilic group. Examples of surfactants which can be used in the direct synthesis of functionalized silica particles from the precursor material include non-ionic, anionic and cationic surfactants. Non-ionic surfactants suitable for use in the present invention include alkyl ethoxylates, polyoxyethylene sorbitan fatty esters, block co-polymers, polyoxyethylene alkyl ethers, polyglycol ethers and alkyl glycosides. Representative examples of surfactants that exhibit solubility in aqueous and nonaqueous solvents are polyoxyethylene fatty acid esters including, but not limited to, polyoxyethylene monostearate, polyoxyethylene sorbitan monopalmitate; polyoxypropylene glycols that include, but are not limited to, polyoxypropylene glycol having a molecular weight of 950 and 3 moles to 85 moles of ethylene oxide, polyoxypropylene glycol possessing a molecular weight of 1200 and 7 to 40 moles of ethylene glycol, polyoxypropylene glycol possessing a mole weight of 1750 and 5 moles to 160 moles of ethylene oxide, polyoxypropylene glycol having a molecular weight of 2050 and 10 moles to 110 moles of ethylene oxide, polyoxypropylene glycol having a 2250 molecular weight and 5 moles to 200 moles of ethylene oxide, polyoxypropylene glycol having a molecular weight of 2750 and 15 to 250 moles of ethylene oxide, and polyoxypropylene glycol having a molecular weight of 3250 and 8 moles to 300 moles of ethylene glycol.

Examples of alkyl ethoxylates are polyoxyethylene octylphenyl ethers, e.g. Triton® X-100 and Triton® X-114, both sold by Dow Chemical in USA. Triton® X-100 and Triton® X-114, have a hydrophobic octyl-phenyl head and a hydrophilic polyoxyethylene tail, with a cloud point of 22° C. and 65° C., respectively. The cloud point for analogues can be increased by increasing the length of the hydrophilic moiety, whereas the cloud point can be decreased by increasing the length of the hydrophobic moiety. Triton® X-100 is 65 further characterized by a HLB value of 13.5. Examples of polyoxyethylene sorbitan fatty esters are polyoxy-ethylene (20)-sorbitan monolaurate, e.g. Tween® 80, and polyoxyethylene-(20)-sorbitan monooleate, e.g. Tween® 20, both sold by ICI of Great Britain. Examples of the block copolymers are combinations of polypropyleneglycol and polyethyleneglycol, e.g. Pluronic® sold by BASF in Germany. Suitable examples of polyoxyethylene alkyl ethers are C12E5, C12E8 and Brij. A suitable example of a polyglycol ether is Tergitol.

The surfactant can be an ionic surfactant or a non-ionic surfactant. In one embodiment, the surfactant is a non-ionic surfactant chosen from polyethylene glycol, polypropylene glycol, block copolymers of ethylene oxide and propylene oxide, cyclic, phenolic, substituted aromatics and substituted phenolics in a polyethylenepolypropylene glycol, alkyl polyethers, polyols, and combinations of two or more thereof.

The dispersant can be chosen from a non-polar material including, but not limited to, cycloaliphatic compound, an alkane comprising 5-20 carbon atoms, an alkene comprising 5-20 carbon atoms, an aromatic compound, a substituted aromatic compound, or weakly polar materials such as an alcohol comprising 8-12 carbon atoms, or a combination of two or more thereof.

The catalyst for the direct synthesis method can be chosen from derivatives of hydroxylamines, tetramethylammonium hydroxide, amino pyridines, or combinations of two or more thereof.

The functionalized particles can have a mean particle size of from about 0.5 micron to about 300 microns; from about 1 micron to about 200 microns; even from about 10 microns to about 100 microns. In one embodiment, the particles have a mean particle size of from about 0.5 micron to about 100 microns. Here as elsewhere in the specification and claims, numerical values can be combined to form new and non-disclosed ranges.

The functionalized particles can have a surface area of from about 20 m$^2$/gram to about 1200 m$^2$/gram; from about 50 m$^2$/gram to about 1000 m$^2$/gram; even from about 100 m$^2$/gram to about 500 m$^2$/gram. In one embodiment, the functionalized particles have a surface area of from about 20 m$^2$/gram to about 500 m$^2$/gram. Here as elsewhere in the specification and claims, numerical values can be combined to form new and non-disclosed ranges.

The functionalized particles, formed by any of the processes described herein, can have an average pore size of from about 10 angstroms to about 2000 angstroms; from about 50 angstroms to about 1500 angstroms; from about 100 angstroms to about 1000 angstroms; even from about 250 angstroms to about 750 angstroms. Additionally, the particles can comprise macropores that are about 0.25 micron or greater; even 0.5 micron or greater.

Aspects of the invention may be further understood with reference to the following examples. The examples are intended to illustrate aspects or embodiments of the invention and are not intended to limit the invention.

EXAMPLES

Preparation of Urethane Link Precursor Material

A 3-(triethoxysilyl) propyl urethane of polyethylene glycol methyl ether is prepared as follows. 350 gms of 350 MW PEG methyl ether into a reactor containing about 1796 gms THF. The agitator is set at 150 RPM. Add 66.95 gms of dibutyltin dilaurate catalyst. Add 272 gms of A35 (Momentive, isocyannato propyl trimethoxy silane) to the reactor. Conduct the reaction at 75° C. under total reflux for at least twenty four hours. At the completion of the reaction, remove the THF by heat striping it at the normal boiling temperature.

Figure 2:
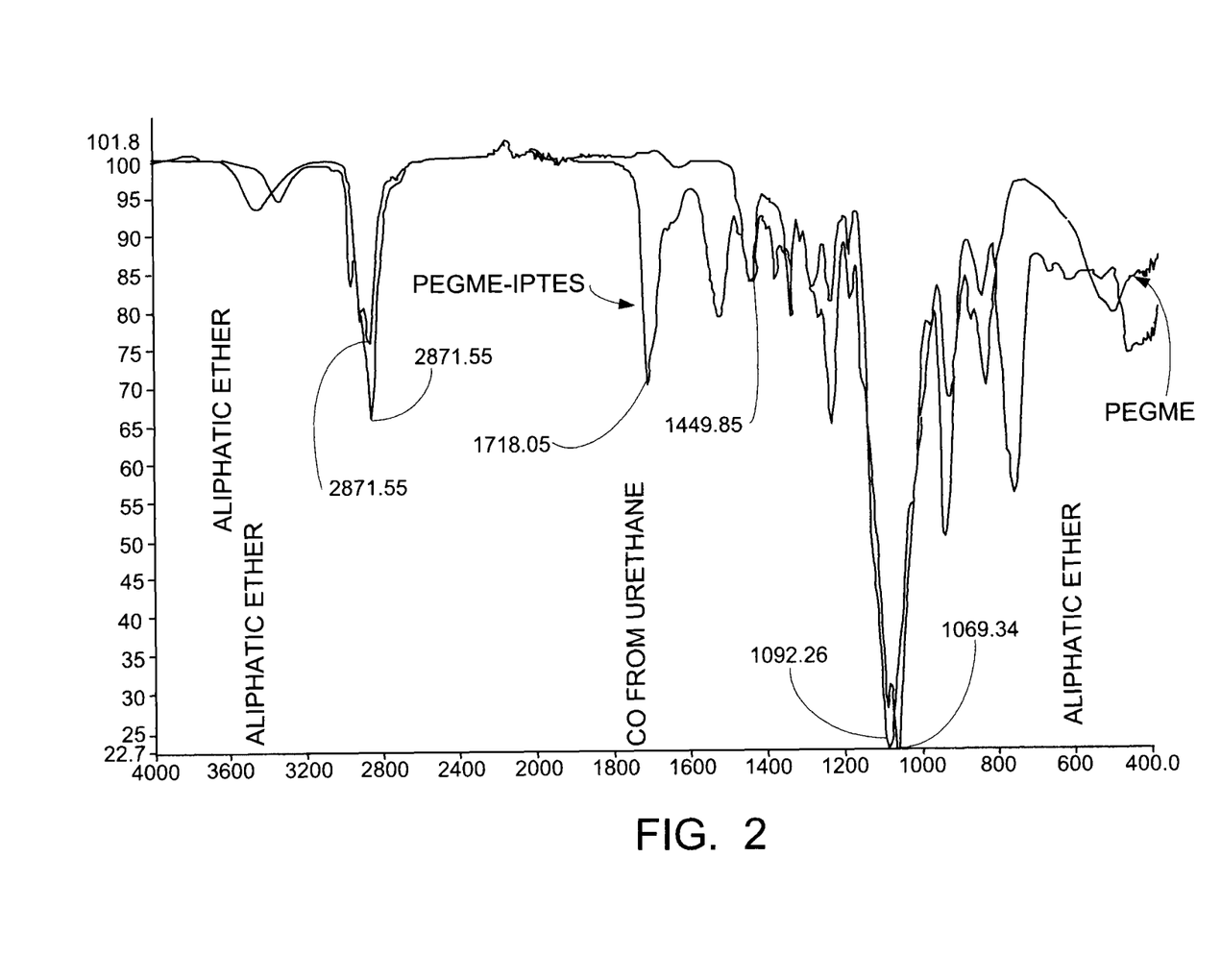
FIG. 2 is an FTIR spectrum of silica particles formed in accordance with an embodiment of the invention in comparison to the precursor PEG methyl ether Isocyannato propyl triethoxysilame (PEGME-IPTES)

FIG. 2 is an ATR-FTIR spectrum comparing PEGME to the urethane precursor material. As shown in FIG. 2, the urethane precursor material has a band at about 1718 cm$^{-1}$, which is indicative of a urethane bond.

Preparation of Silica Particles with Surface Silanols

In the preparation of nearly spherical particles, tetramethylorthosilicate is added in a controlled manner to a solution that contains butanol or any higher alcohols such as pentanol, etc. and an acid catalyst such as HCl or other inorganic acids, and other suitable organic acids such as acetic and aspartic acids. The reaction is conducted in an adiabatic condition and allowed to reach a maximum exothermicity. After the TMOS addition is completed, the reaction is allowed to equilibrate to 30° C. Co-surfactants such as tertiary amyl alcohol and cyclohexane are added and equilibrated for 20 minutes or so. Once equilibrated, the precursor is then added to a reactor that contains mostly water, some alcohols such as butanol and a non-ionic surfactant such as polyethylene glycol. The size of the particle can be controlled by mixing or by the amount of polyethylene glycol and molecular weight. Moreover, after the precursor addition is complete, some more butanol is added to provide stability to the particles. The particle size is controlled also by changing the agitation speed.

Precursor material to make the particle is prepared from 127 gms of butanol, 45.23 gms of water and 1.606 gms of concentrated HCl. To this, TMOS is added at 3.58 gms/min. The total TMOS charged is 390.3 gms. The resulting reaction mixture is allowed to equilibrate to 30° C. After equilibration, 188.3 gms of tertiary amyl alcohol (2-methyl 2-butanol) ad 107.6 gms of cyclohexane is added to the precursor reactor.

The particle is generated in another reactor containing 873 gms of water, 195 gms of 8% (w/w) of PEG 1500 (MW) and 98 gms of butanol. The precursor from the previous preparation is added to this (particle reactor) at a rate of 11.62 gms/min. The particle reactor temperature is maintained at 52° C. At the end of precursor addition, 313.6 gms of butanol is added and the resulting mixture is allowed to equilibrate to 52° C.

The particle formation is enhanced by a programmed addition of 0.5% ammonium hydroxide. The table below provides a programmed base addition which gives a particle size distribution shown in FIG. 3 (optical microscope) and FIG. 4 (SEM image).

| Particle Reactor | | | Base addition | |
|---|---|---|---|---|
| Time | Temp Bath | Reactor Temp (° C.) | Time from Start of base addition | Timed Base Addition |
| 3:53:00 | 56 | 52.4 | 0:00:00 | None |
| 3:58:00 | 56 | 50.9 | 0:05:00 | none |
| 4:11:00 | 56 | 51.3 | 0:19:00 | Base addition |
| 4:23:00 | 56 | 52.3 | 0:31:00 | 30 sec base |
| 4:29:00 | 56 | 53.3 | 0:41:00 | 30 sec base |
| 4:39:00 | 56 | 52.3 | 0:49:00 | 30 sec base |
| 4:47:00 | 56 | 52.1 | 0:58:00 | 30 sec base |
| 4:56:00 | 56 | 51.8 | 1:05:00 | 30 sec base |
| 5:03:00 | 56 | 51 | | none |
| 5:11:00 | 56 | 51.2 | | None |
| 5:15:00 | 56 | | | None |
| 5:25:00 | 56 | | | None |
| 5:36:00 | 56 | 52.6 | | None |
| 5:55:00 | 56 | 52.1 | | None |
| 6:06:00 | 56 | 52.4 | 129:00.0 | None |
| 6:18:00 | 56 | 52.3 | | None |
| 6:29:00 | 56 | 53.2 | | None |
| 6:41:00 | 56 | 51.7 | | None |
| 6:53:00 | 56 | 53.4 | 180:00.0 | None |
| 7:05:00 | 56 | 53.2 | 3:15:00 | 10 sec base |
| 7:13:00 | 56 | 53 | | none |
| 7:29:00 | 56 | 53.1 | 3:43:00 | 10 sec base |
| 7:41:00 | 56 | 53.4 | | None |
| 7:53:00 | 56 | 52.8 | | None |
| 9:08:00 | 56 | | 147:00.0 | None |
| 9:20:00 | 56 | | 5:31:00 | 10 sec base |
| 9:29:00 | 56 | | | None |
| 9:35:00 | 56 | | 5:45:00 | 30 sec base |
| 9:43:00 | 56 | | | None |
| 9:49:00 | 56 | 53.1 | 5:58:00 | 30 sec base |
| 9:56:00 | 56 | | | None |
| 10:03:00 | 56 | | 6:10:00 | 30 sec addition at 2 min intervals |
| 10:08:00 | 56 | 51.5 | | 30 sec addition at 2 min intervals |
| 10:16:00 | 56 | | 6:23:00 | 30 sec addition at 2 min intervals |
| 10:21:00 | 56 | 53.4 | | 30 sec addition at 2 min intervals |
| 10:29:00 | 56 | | 6:40:00 | 2 min addition at 5 min intervals |
| 10:38:00 | 56 | 53.1 | | stop |

Figure 1:
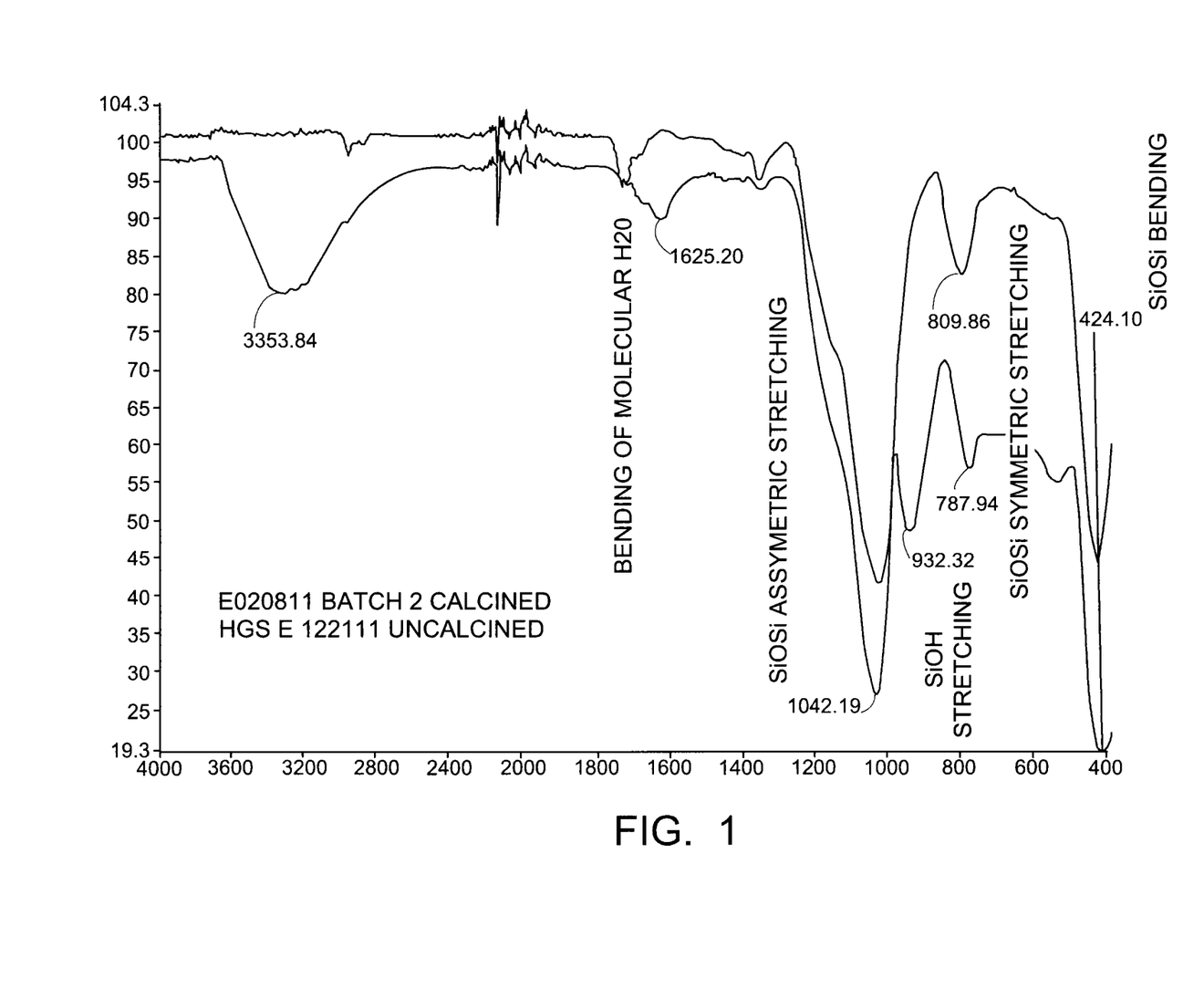
FIG. 1 is an FTIR spectrum of a urethane precursor material such as a silica with significant presence of silanol.
Figure 3:
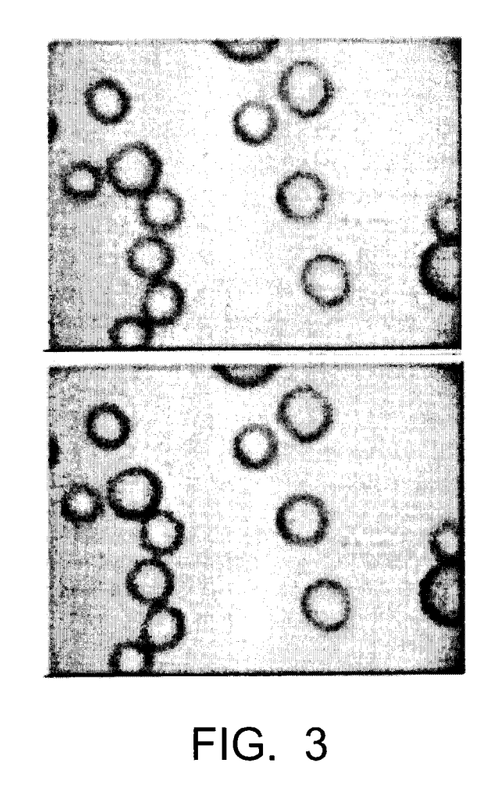
FIG. 3 is an optical image of silica particles formed in accordance with an embodiment of the invention.
Figure 4:
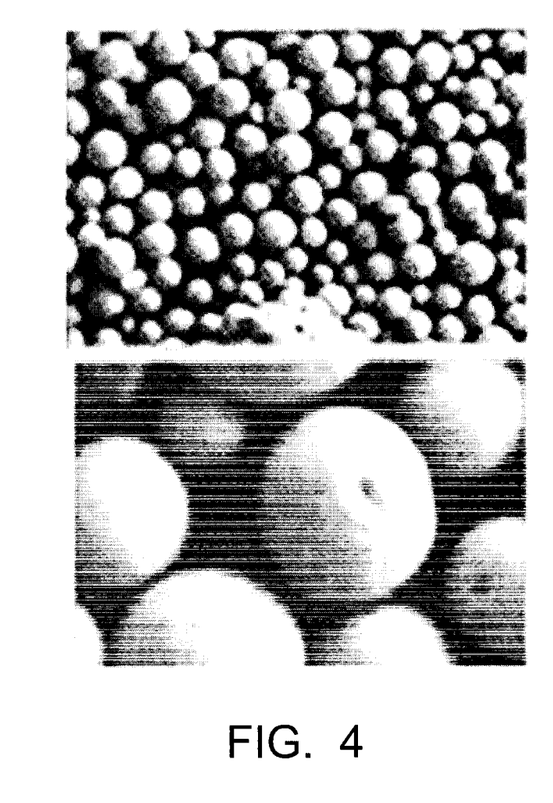
FIG. 4 is an SEM image of silica particles formed in accordance with an embodiment of the invention.

The silica slurry is then stripped off the organics, washed with acetone and then stripped of the water using a rotovap. FIG. 1 provides an ATR FTIR of a typical material prepared by the above mentioned synthesis (HGS E122111), which shows significant silanols by the stretching at 952 cm$^{-1}$. (mainly surface vs. a comparable silica material which has been calcined). FIGS. 3 and 4 are optical and SEM images, respectively of the particles obtained in this example.

Grafting of PEGME-IPTES to Silica Particles

Figure 5:
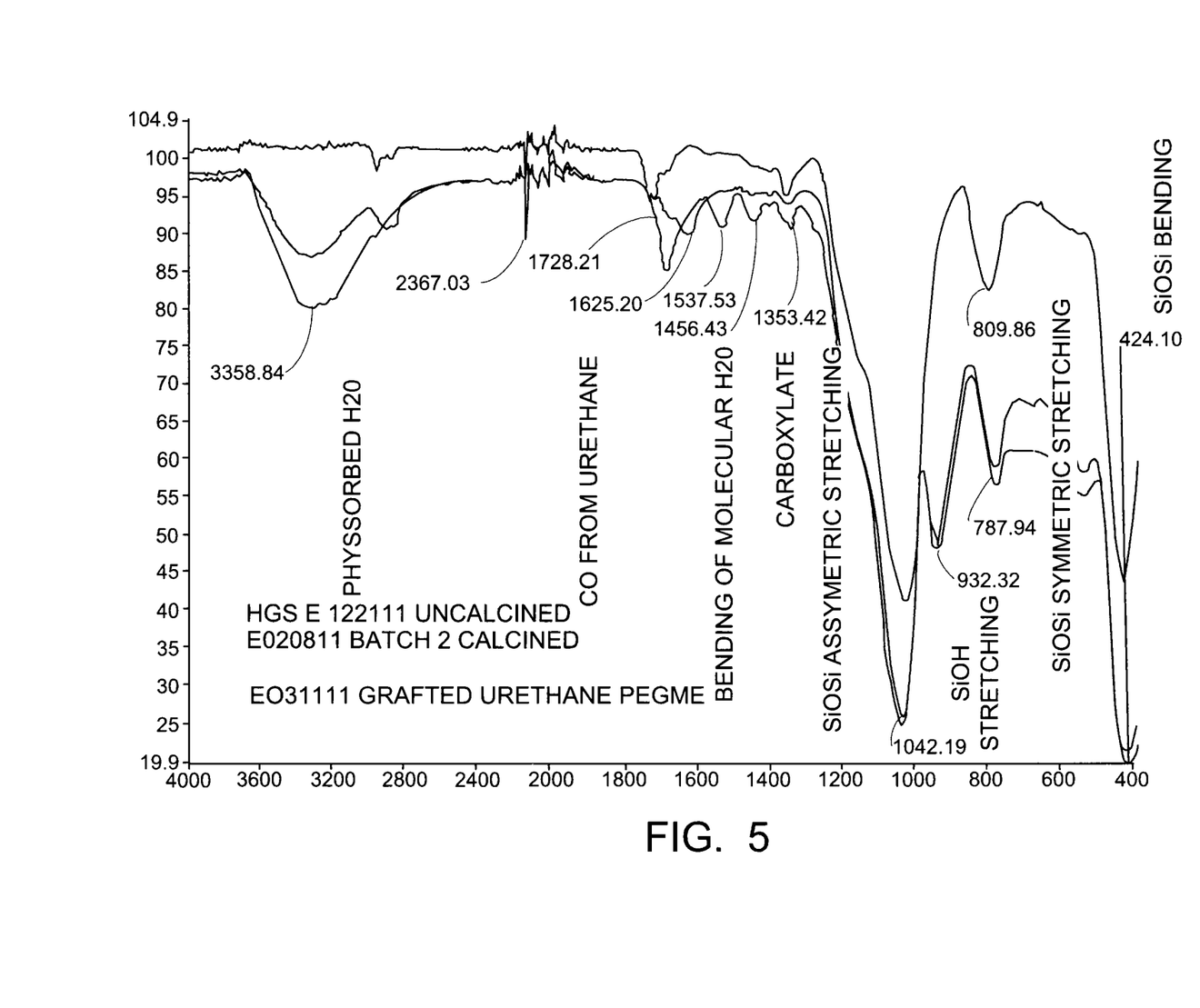
FIG. 5 is an FTIR spectrum of functionalized silica particles formed by grafting a urethane precursor material to silica particles in accordance with an embodiment of the invention.

PEGylated silica is formed by grafting the PEGME-IPTES precursor to the silica particles as follows: 50 grams of the PEGME-IPTES precursor is added to a solution of 50 grams of the silica particles, 0.5 grams of Pluronic, and 50 grams of cyclohexane. The mixture is reacted at 80° C. with stirring at 400 rpm. A base solution comprising 1.5% NH$_4$OH solution is added to control the pH of the mixture. FIG. 5 is an ATR-FTIR of the PEG grafted material. In this example, the residual silanol is still large indicating that the concentration of the PEG urethane precursor can be increased to further coat or functionalize the surface of the silica.

Direct Formation of PEGylated Silica from PEGME-IPTES

Figure 6:
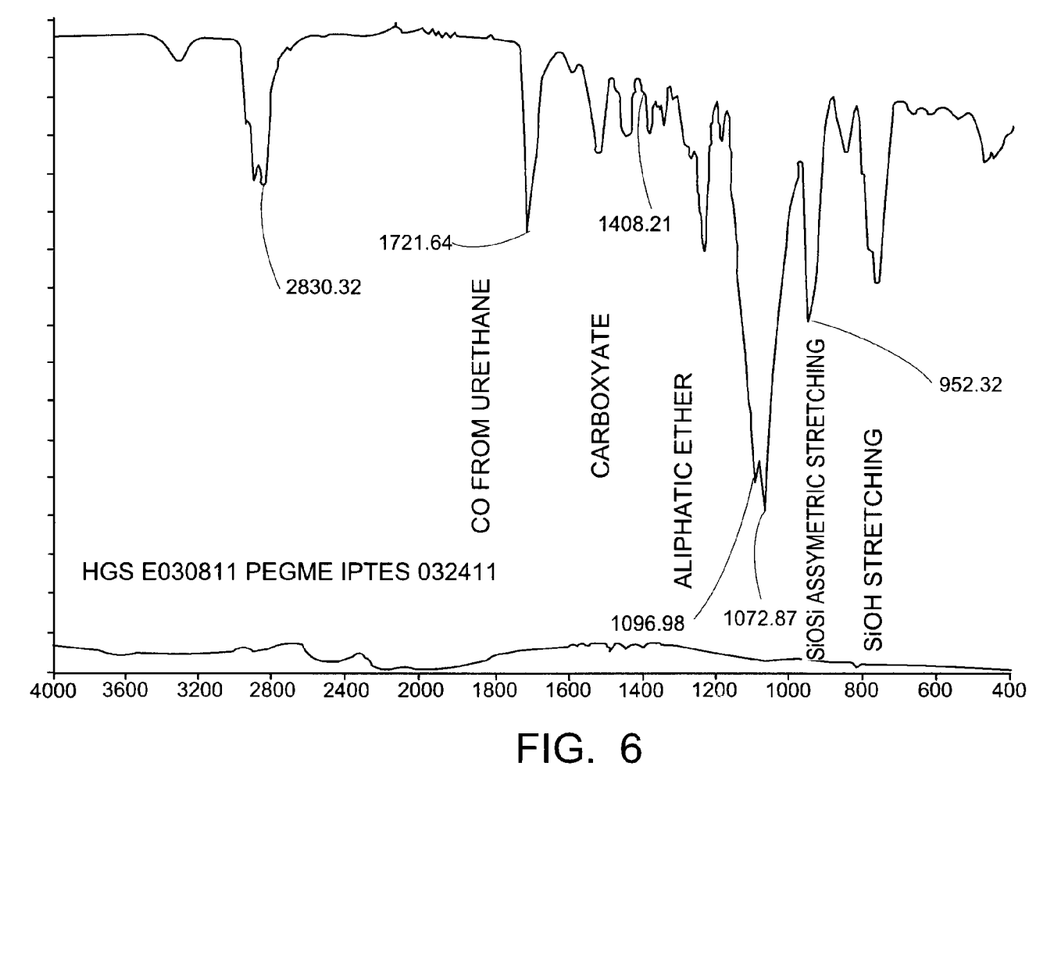
FIG. 6 is an FTIR spectrum of functionalized silica particles formed by direct particle synthesis from a precursor material in accordance with an embodiment of the invention.
Figure 7:
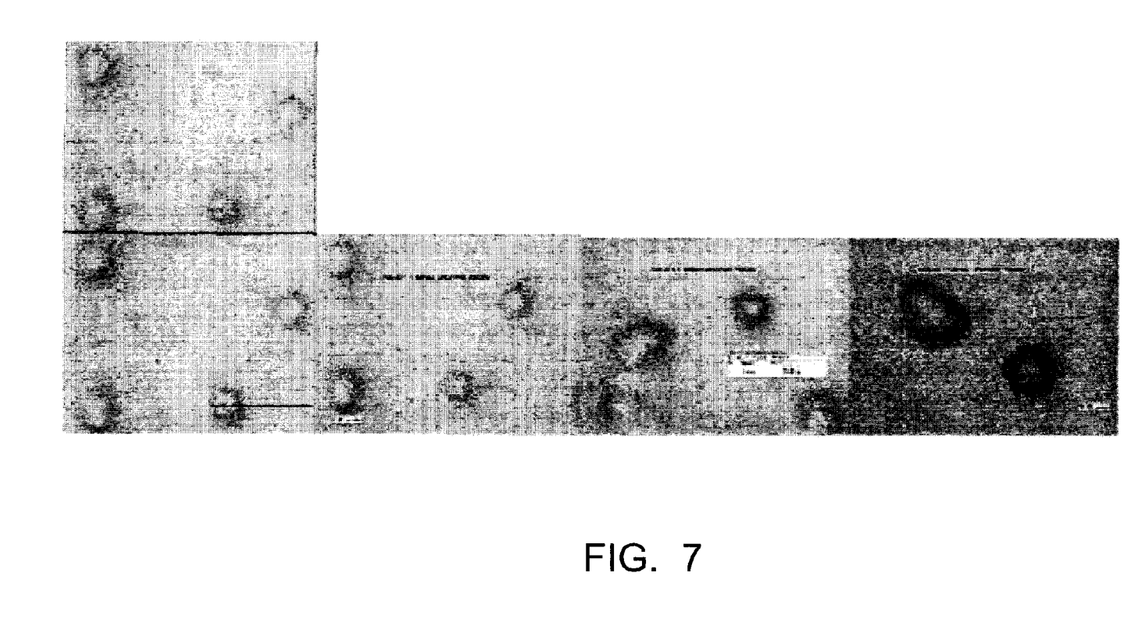
FIG. 7 is an optical image showing functionalized silica particles formed by a direct synthesis method in accordance with an embodiment of the invention.

To a reactor containing 1323.3 gms of water at 80° C., is added 198.8 g of cyclohexane, 1 g of Pluronic 2000 (MW), 198.5 gms of isocyannato propyl triethoxy silane-PEG methyl ether 350 (MW) at a rate of 11.94 gms/min. The reaction mixture is mixed for 2 hour under total reflux at 200 RPM. For particle formation, a base such as ammonium hydroxide at a concentration of 1.5% is added at 4 gms/min until the pH of 6.5 is achieved. An ATR-FTIR spectrum is shown in FIG. 6, with the bands being indicative of a PEGME hydrogel silica. FIG. 7 is an optical microscope showing the particles formed by the direct synthesis method.

Embodiments of the invention have been described above and, obviously, modifications and alterations will occur to others upon the reading and understanding of this specification. The invention and any claims are intended to include all modifications and alterations insofar as they come within the scope of the claims or the equivalent thereof.

I claim:

1. A process for producing a metal-containing particle having an organofunctional grafted thereto, the method comprising:
    forming a metal containing particle by:
    (a) forming a first phase comprising a mixture of water, a metal source,
    wherein the metal source comprises a metal selected from the group consisting of Si, Ti, Fe, Al, Zr, Nb, Y, B, Ce, V, Zn, Cu, Ni, Co, Ge, Mn, Mg, Cr, Fe, V, a rare earth metal, or a combination of two or more thereof, a first catalyst, a first surfactant, and a first alcohol;
(b) adding the first phase to a second phase comprising water, a second alcohol, and a second surfactant to form a blend;
(c) treating the blend with a phase enhancer; and
(d) treating the blend from (c) with a second catalyst to form metal-containing particles comprising one or more surface hydroxyl groups; and
grafting a reactive precursor to the particles, wherein the reactive precursor comprises a metal component selected from the group consisting of Si, Ti, Fe, Al, Zr, Nb, Y, B, Ce, V, Zn, Cu, Ni, Co, Ge, Mn, Mg, Cr, Fe, V, a rare earth metal, or a combination of two or more thereof.

2. The process of claim 1, wherein the reactive precursor comprises a metal component comprising a metal atom comprising a leaving group attached to the metal, and an organic functional moiety attached to the metal atom.

3. The process of claim 2, wherein the leaving group is selected from the group consisting of an alkoxy group, a halogen, or a combination thereof.

4. The process of claim 2, wherein the organic functional moiety is selected from the group consisting of a glycol, an alkylene glycol, an acrylic, an amide, a quaternary ammonium compound, a phosphate, a phosphonate, a sulfonate, an amino, a mercapto, an alkyl, an alkyne, an alkene, an azo, a conjugated alkene, a cyclic compound, an alcohol, or a combination of two or more thereof.

5. The process of claim 2, wherein the organic functional moiety is a urethane linked polyalkylene glycol, a urea linked polyalkylene glycol, or a combination of two or more thereof.

6. The process of claim 1, wherein the metal source is chosen from a metal alkoxide, a hydrolysable organometallic compound, oxo metal oligomers, a metal chloride, a metal nitrate, a metal sulfate, or mixtures of two or more thereof.

7. The process of claim 1, wherein the metal source comprises a siloxane oligomer derived from an alkoxysilane, and the molar ratio of water to siloxane oligomer in (a) is sufficient to form a siloxane heptamer, a cyclic siloxane, or a mixture thereof.

8. The process of claim 1, wherein the first catalyst comprises a catalyst selected from the group consisting of hydrochloric acid, nitric acid, sulfuric acid, phosphoric acid, fluoric acid, formic acid, acetic acid, propionic acid, butanoic acid, pentanoic acid, hexanoic acid, monochloroacetic acid, dichloroacetic acid, trichloroacetic acid, trifluoroacetic acid, oxalic acid, malonic acid, sulfonic acid, phthalic acid, fumaric acid, citric acid, maleic acid, methylmalonic acid, adipic acid, p-toluenesulfonic acid, ammonium hydroxide, quaternary ammonium hydroxides, hydroxylamines, derivatives of hydroxylamines, amino pyridines, or a combination of two or more thereof.

9. The process of claim 1, wherein the first surfactant is selected from the group consisting of a polyglycol, an alkylene oxide, a cyclic hydrocarbon, a linear or branched aliphatic hydrocarbon having carbon numbers from 5 to 12 and alkyl derivatives thereof, or combinations of two or more thereof or a combination thereof.

10. The process of claim 1, wherein the first alcohol is chosen from a primary alcohol, a secondary alcohol, or a combination of two or more thereof.

11. The process of claim 1, wherein the first and/or second alcohol comprises a linear alcohol having 1-10 carbon atoms.

12. The process of claim 1, wherein the second surfactant comprises a nonionic surfactant.

13. The process of claim 1, wherein the phase enhancer is selected from the group consisting of a primary or secondary alcohol.

14. The process of claim 1, wherein the second catalyst is selected from the group consisting of an organic base, a non-metal base that promotes nucleophilic substitution or combinations of two or more thereof.

15. The process of claim 1, wherein (d) further comprises drying the particles, calcining the particles, or both drying and calcining the particles to reduce the concentration of surface hydroxyls on the particles.

16. The process of claim 15, wherein the particles have a residual water content of between 0.1% to 15 wt % after the drying, calcining, or both the drying and calcining of the particles.

17. The process of claim 1, wherein grafting the reactive precursor to the particles comprises:
(e) adding the reactive precursor material to a system comprising the particles, a water free aprotic solvent, and a non-ionic surfactant; and
(f) adding a base catalyst to the resulting solution of (e).

18. The process of claim 17, wherein the water free aprotic solvent is chosen an alkane having 5-20 carbon atoms; an alkene having 5-20 carbon atoms; an aromatic compound; tetrahydrofuran; pyrrolidone; a substituted pyrrolidone; diethyl ether; chloroform; carbon tetrachloride; acetone; acetonitrile; dimethyl sulfoxide; furfural; or a combination of two or more thereof.

19. The process of claim 17, wherein the non-ionic surfactant of the system in (e) comprises polyethylene glycol, polypropylene glycol, block copolymers of ethylene oxide and propylene oxide, cyclic, phenolic, substituted aromatics and substituted phenolics in a polyethylenepolypropylene glycol, alkyl polyethers, polyols, and combinations of two or more thereof.

20. The process of claim 17, wherein the base catalyst of (f) is chosen from ammonium hydroxide, quaternary ammonium hydroxides, hydroxylamines, tetramethylammonium hydroxide, derivatives of hydroxylamines, amino pyridines, or combinations of two or more thereof.

21. The process of claim 17 wherein the resulting mixture of (e) and (f) is reacted with stirring at a rate of from about 30 RPM to about 400 RPM.

22. The process of claim 17, wherein the metal-containing particles have a mean particle size of from about 0.5 micron to about 300 microns.

23. The process of claim 17, wherein the metal-containing particles have a surface area of from about 20 $m^2$/gram to about 1200 $m^2$/gram.

24. A process for forming a functionalized metal-containing particle comprising:
(a) providing a first solution comprising water, a surfactant, and a non-polar dispersant;
(b) adding a reactive precursor to the first part to form a mixture, wherein the reactive precursor comprises a metal selected from the group consisting of Si, Ti, Fe, Al, Zr, Nb, Y, B, Ce, V, Zn, Cu, Ni, Co, Ge, Mn, Mg, Cr, Fe, V, a rare earth metal, or a combination of two or more thereof, the reactive precursor comprising a metal atom comprising a leaving group attached to the metal atom, and an organic functional moiety attached to the metal atom, wherein the organic functional moiety is selected from the group consisting of a glycol, an alkylene glycol, an acrylic, an amide, a quaternary ammonium compound, a phosphate, a phosphonate, a sulfonate, or a combination of two or more thereof; and (c) adding a catalyst to the mixture of (b) and reacting with heating under reflux to form functionalized metal-containing particles.

25. The process of claim 24, wherein the leaving group is selected from the group consisting of an alkoxy group, a halogen, or a combination thereof.

26. The process of claim 24, wherein the organic functional moiety is selected from the group consisting of a urethane linked polyalkylene glycol, a urea linked polyalkylene glycol, or a combination of two or more thereof.

27. The process of claim 24, wherein the surfactant of solution (a) is an ionic or a non-ionic surfactant.

28. The process of claim 27, wherein the non-ionic surfactant is selected from the group consisting of polyethylene glycol, polypropylene glycol, block copolymers of ethylene oxide and propylene oxide, cyclic, phenolic, substituted aromatics and substituted phenolics in a polyethylenepolypropylene glycol, alkyl polyethers, polyols, and combinations of two or more thereof.

29. The process of claim 24, wherein the non-polar dispersant is selected from the group consisting of a cycloaliphatic compound, an alkane comprising 5-20 carbon atoms, an alkene comprising 5-20 carbon atoms, an aromatic compound, a substituted aromatic compound, an alcohol comprising 8-12 carbon atoms, or a combination of two or more thereof.

30. The process of claim 24, wherein the catalyst is chosen from derivatives of hydroxylamines, tetramethylammonium hydroxide, amino pyridines, or combinations of two or more thereof.

31. The process of claim 24, wherein the temperature of the reaction is from about 30° C to about 100° C.

32. The process of claim 24, wherein the temperature of the reaction is from about 50 to about 90° C.

33. The process of claim 24 wherein the reaction of (c) is conducted with stirring at a rate of from about 30 RPM to about 250 RPM.

34. The process of claim 24, wherein the functionalized metal-containing particles have a mean particle size of from about 0.5 micron to about 100 microns.

35. The process of claim 24, wherein the functionalized metal-containing particles have a surface area of from about 20 $m^2$/gram to about 500 $m^2$/gram.

* * * * *